United States Patent
Blose

[15] 3,685,231
[45] Aug. 22, 1972

[54] EDGE PROTECTOR, MOULDING OR BEADING

[72] Inventor: Werner Blose, Eisenlensweg 17, 2 Hamburg 28, Germany

[22] Filed: Dec. 9, 1968

[21] Appl. No.: 782,352

[52] U.S. Cl. .................................. 52/716, 52/395
[51] Int. Cl. ...................... E04f 19/02, E04f 15/14
[58] Field of Search ..49/490, 491, 462; 52/627, 502, 52/403, 716–718, 395; 161/99, 100

[56] References Cited

UNITED STATES PATENTS

| | | | |
|---|---|---|---|
| 3,167,825 | 2/1965 | Zoller | 49/490 |
| 3,177,534 | 4/1965 | Millhouse et al. | 49/490 |
| 3,333,381 | 8/1967 | Stark et al. | 49/490 |
| 3,363,390 | 1/1968 | Crane et al. | 52/627 |
| 3,411,244 | 11/1968 | Horner | 49/491 |

FOREIGN PATENTS OR APPLICATIONS

| | | | |
|---|---|---|---|
| 1,102,045 | 2/1968 | Great Britain | 52/716 |
| 1,457,531 | 9/1966 | France | 52/716 |
| 1,044,475 | 9/1966 | Great Britain | 52/716 |

Primary Examiner—Frank L. Abbott
Assistant Examiner—James L. Ridgill, Jr.
Attorney—Baldwin, Wight, Diller and Brown

[57] ABSTRACT

This invention relates to an edge protector, moulding or beading made of deformable material for bordering the edges of structures of constant or variable thickness, which protector, moulding or beading has a carrier of semi rigid, resiliently deformable material of U-shaped cross section which is embraced by a covering material of rubber or plastics material, that portion of the covering material which is arranged on the inner faces of the arms of the carrier being formed of a softer material that the remainder of the covering material so that once the protector, moulding or beading has been applied to the edge, the softer material, which is in contact with the edge, will provide a very strong grip.

2 Claims, 3 Drawing Figures

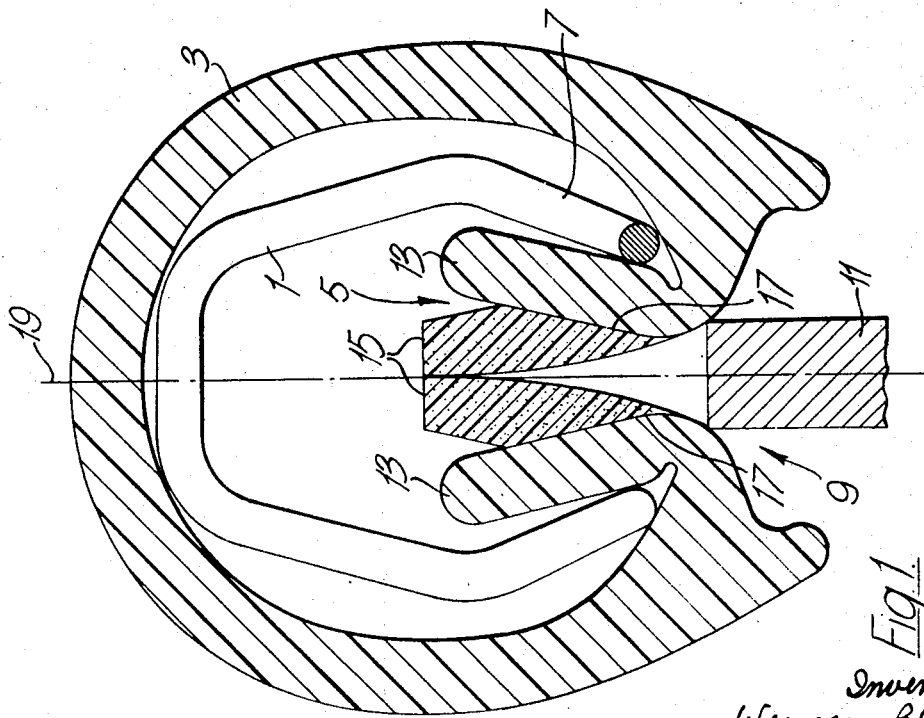

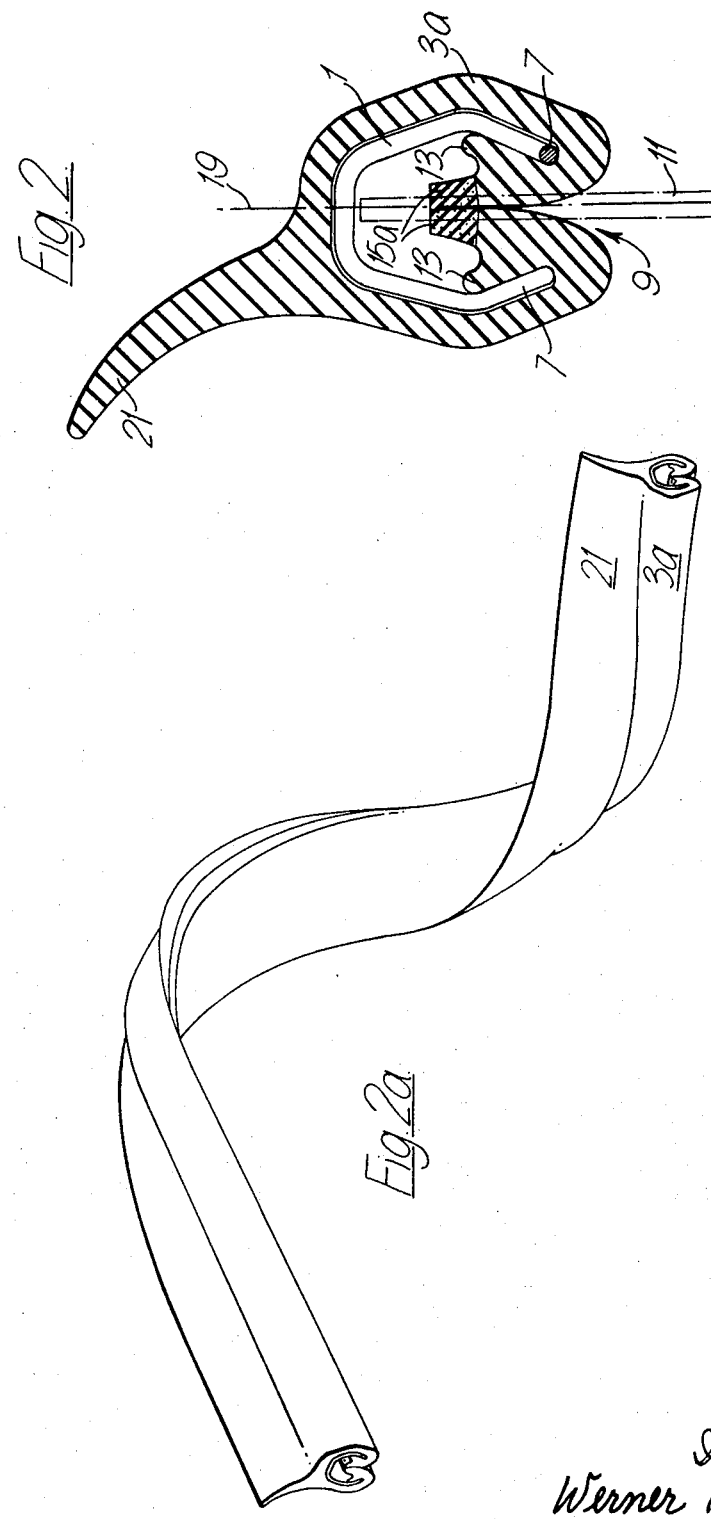

EDGE PROTECTOR, MOULDING OR BEADING

This invention relates to an edge protector, moulding or beading made of deformable material for bordering the edges of structures of constant or variable thickness. Throughout the remainder of this specification, the edge protector, moulding or beading, which is substantially U-shaped in cross section, will be referred to as a beading. The beading is designed to be pushed over the edge to be bordered and it is adhered to the edge by friction.

Such beading is used, for example, in the automotive industry for bordering flange or sheet edges to act as an edge trimmer, or as a carrier for a seal, draught excluder or weathering strip. The beading contains a carrier which is U-shaped in cross section, and which is made of metal, rigid plastics material or of wire running in coils or of zig zag formation and having threads knitted into it. The purpose of the carrier is to bias the arms of the U-shaped beading together in order to increase the adhesion power of the beading. The carrier is at least partly surrounded by a covering material which may be made of a plastics material of a relatively high rigidity, such as for example polyvinylchloride with a hardness of about 75° Shore A, or it may be made of natural or synthetic rubber.

The present invention seeks to improve the ability of such bending to adhere to the edge to which it is to be applied.

To improve the adhesion powers of such beading, it is known to provide the reinforcing metallic carrier with points or edges projecting through the covering material into the interior of the U, and these points or edges grip the surfaces of the edge to be protected. Such a construction provides a good grip, but it has the disadvantage that the surfaces of the edge may be damaged, especially if they are lacquered. Beading is also known which is made of a non-rigid plastics material, for use, for example, when it is required to fix roof lining material in motor cars. The material is secured to the roof around the edges of the roof by the beading, and since the strong metallic grip of the above mentioned beading could easily cause tearing of the roof lining material, the beading made of non-rigid plastics material is used.

According to the present invention, we provide an edge protector, moulding or beading made at least partly of rubber or plastics material for mounting on the edge of a flange or sheet of constant or variable thickness said beading having a substantially U-shaped, resiliently deformable cross section and at least a part of the interior of the U, which part is adapted to engage said edge, being formed of a material which is less rigid (i.e. softer) than the remainder of the beading. More particularly, an edge protector, moulding or beading according to the present invention, for mounting on a flange or sheet edge of constant or variable thickness is substantially U-shaped in cross section to enable it to be mounted on the edge, with one arm of the U on either side thereof so as frictionally to engage the edge, and includes a resilient substantially rigid carrier of U-shaped cross section at least partly surrounded by a rubber or plastics material covering material, the covering material completely surrounding the outer surface of the carrier and at least an end portion of the inner surface of the arms of the carrier, that portion of the covering material which is adapted to engage the edge on which the beading is to be mounted being made of a less rigid (i.e., softer) material that the remaining part of of the covering material.

The main body of the covering material may be made of solid rubber or solid neoprene and that portion of the covering material which is adapted to engage the edge may be made of soft rubber, soft neoprene or sponge neoprene. Alternatively, the covering material may be made of polyvinylchloride of two different hardnesses. By forming that part of the covering material which is adapted to engage the edge of a softer material than the remainder of the covering material, a good seal is provided on the edge and dampness is therefore excluded. Furthermore, the part has greater elastic properties and therefore tends to adhere to the edge more satisfactorily.

The carrier may either form a loose fit within the covering material or it may be formed integral with the covering material.

Preferably at least a portion of the arms of the carrier are turned inwardly towards each other and in one embodiment, that part of the covering material adapted to engage the edge is part of a wedged shape portion and is arranged on one side of the wedge, the other side of each wedge being adjacent or in contact with one of said inwardly turned portions of the arms of the carrier. In this construction, the wedge shaped portions are bifurcated to provide two fingers one of which comprises the softer material and the other the other material. In this construction, the boundary line between the two fingers is preferably inclined outwardly towards a center line of the beading at an angle of about 15°. This means that the two softer fingers are substantially wedged shaped and they provide maximum grip on the edge.

In alternative embodiments, fins of the softer material extend from the inner surface of each arm of the beading for engagement with the edge.

Several embodiments of beading according to the invention are now described with reference to the accompanying drawings, in which:

FIG. 1 is a section through one embodiment, to an enlarged scale,

FIG. 2 is a section through a second embodiment, to a smaller scale, and

FIG. 2a is a perspective view of a length of beading of the embodiment of FIG. 2.

Referring to FIG. 1, of the accompanying drawings, the beading comprises a carrier 1, having a generally U-shaped cross-section, which has a generally U-shaped covering material 3 made of a polyvinylchloride, with a hardness of about 75° Shore A. The arms of the covering material are turned inwardly at 5 to embrace the free end 7 of the carrier 1. These free ends 7 are turned inwardly with respect to the remainder of the arms of the carrier 1 to enable the inwardly turned part 5 of the covering material to be held in place and to provide a wedging action, as will be explained. As can be seen in FIG. 1, entry to the interior of the beading is by way of a funnel shaped throat 9. An edge 11 to which the beading is to be applied is shown at the entrance to the throat 9.

The inwardly turned parts 5 of the covering material are substantially wedge shaped, and are each bifurcated at their innermost ends to provide a first pair of fingers 13 adjacent the free ends 7 of the carrier 1, and a second pair of edge-embracing fingers 15. The fingers 13 are made of the same material as the main body of the covering material 3, but the fingers 15 are made of a softer material than the remainder of the covering material, so as to provide a better grip on the edge 11. The covering material 3 is made by a known dual extrusion process. The softer fingers 15 merge smoothly with the outer part of the throat 9, which is made of the harder material. The softer material may comprise a polyvinylchloride having a hardness of about 60° Shore A.

The boundary line 17 between the fingers 13 and 15 makes an acute angle with the center line 19 of the beading and in the drawing this angle is shown as being between 10° and 15°. Once the beading has been mounted on the edge 11, this angle is reduced to somewhat less than 10°. Because the free ends 7 of the carrier 1 are inwardly turned, it will be appreciated that if a force is applied to the beading once it has been mounted on the edge 11, to pull it off the edge, a wedging action will occur between the inturned free ends 7 of the arms of the carrier 3 and the edge 11, due to the shape of the inturned portion 5 of the covering material, and this wedging action will tend to compress the fingers 15 thereby forcing them even harder on to the edge 11 due to their natural resiliency. Because of the friction between the surfaces of the edge 11 and the surfaces of the fingers 15, the fingers 15 will tend to move outwardly of the beading with the edge 11, should any attempt be made to disengage the beading from the edge and this will therefore increase the wedging effect.

In the embodiment shown in FIG. 2, a similar construction is shown, but in this construction, the beading, instead of being made of plastics material, is made of rubber. Parts in the FIG. 2 embodiment which are the same as in the FIG. 1 embodiment bear the same reference numerals, and similar parts bear the same reference numeral followed by the suffix a. The covering material 3a is made of a solid rubber or solid neoprene and forms a closer fit around the carrier 1 than in the FIG. 1 construction. The fingers 13 lie against the inner surface of the inwardly turned part 7 of the carrier 1 and only the tips of the edge embracing fingers 15a are made of softer material than the remainder of the covering material 3a. This softer material is soft rubber, soft neoprene or sponge neoprene and the borders between the two materials lie substantially normal to the center line 11 of the beading. This means that when the beading is mounted on an edge, there is less chance of the edge damaging the inner most part of the throat 9. The same wedging action is achieved, however, when an attempt is made to remove the beading from the edge. In the FIG. 2 embodiment, the beading is provided with a tail 21 which forms a seal, for example for use on a car boot.

As will be appreciated from the above description, a feature common to all beading made in accordance with the present invention is that the main body of the covering material is made of a harder material than that part of the covering material which is adapted to engage the edge on which the beading is to be mounted. In all cases, the beading is made by a dual extrusion technique although it is envisaged that other known techniques can be used. Furthermore, the covering material may be made either of a plastics material or of synthetic or natural rubber material. It will also be appreciated that it is immaterial as to whether the carrier is integral with the covering material or whether the covering material is mounted on the carrier. The carrier may be of any known construction such as wire having a genrally U-shaped cross section which has been bent upon its self in zig zag fashion and into which has been knitted cotton threads. Alternatively, it may be stamped out of a sheet of metal or rigid plastics material and suitably formed to provide a key between the covering material and the carrier, particularly if the covering material is cast or extruded around the carrier, or of any other known construction.

It will also be understood that the beading may be of any known or new cross section, provided that the part of the covering material adapted to engage the edge is made of a softer material than the remainder of the covering material.

What we claim is:

1. An edge protective beading comprising in cross section:
   a. a substantially rigid, and generally U-shaped carrier;
   b. the legs of said carrier diverging outward and then converging inward to terminate in resilient free ends;
   c. a covering material wrapped loosely around the outer surface of said carrier and extending around said free ends and into the interior of said carrier;
   d. the portion of said covering material extending to said interior of said carrier forming a pair of grippers for holding said covering material on said carrier and for holding said beading on said edge;
   e. said grippers being wedge-shaped to increase in thickness with distance from said free ends for fitting inside said convergent free ends to engage said edge;
   f. confronting portions of said grippers being formed of a material substantially softer than the rest of said covering material.

2. The beading of claim 1 wherein the innermost ends of each of said grippers are bifurcated to form two fingers, one of the fingers of each of said pairs of said fingers engaging the inside of said inturned free ends, and the other of the fingers of each of said pairs of said fingers being mutually confronting and formed of said softer material.

* * * * *